Figure 1:
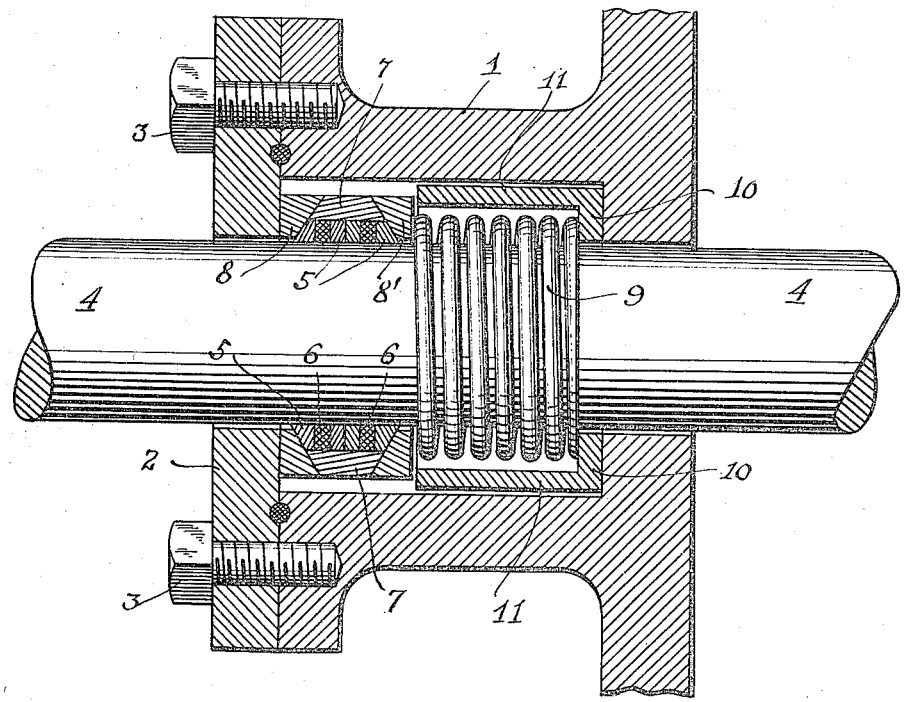

W. SUDEKUM.
METALLIC PACKING.
APPLICATION FILED JAN. 27, 1913.

1,074,663.

Patented Oct. 7, 1913.

Witnesses
J. Milton Jester
H. P. Roberts

Inventor
William Sudekum,
By W. Schonborn,
Attorney

UNITED STATES PATENT OFFICE.

WILLIAM SUDEKUM, OF NASHVILLE, TENNESSEE.

METALLIC PACKING.

1,074,663.

Specification of Letters Patent.

Patented Oct. 7, 1913.

Application filed January 27, 1913. Serial No. 744,421.

*To all whom it may concern:*

Be it known that I, WILLIAM SUDEKUM, a citizen of the United States, residing at Nashville, in the county of Davidson and State of Tennessee, have invented certain new and useful Improvements in Metallic Packing, of which the following is a specification.

My invention relates to metallic packing and is designed more especially for piston rods and valve stems of engines, pumps and the like, the purpose being to supply a packing which will insure the maintenance of a tight joint capable of being easily and economically applied and free from unusual wear and corrosion, and more particularly adapted to vibrate with the rod or stem and thereby obviate binding of the parts and unsteady movement.

For a full understanding of the invention and the merits thereof and also to acquire the knowledge of the details of construction and means for applying the invention, reference is to be had to the following description and accompanying drawings.

While the invention may be adapted to different forms and conditions by changes in the structural and minor details without departing from the spirit or essential features thereof, still the preferred embodiment is shown in the accompanying drawings.

My invention consists of structural features and relative arrangement of parts which will be hereinafter more fully described and particularly pointed out in the appended claims.

The same reference characters indicate the same parts in the several figures of drawings in which—

Figures 2, 4:
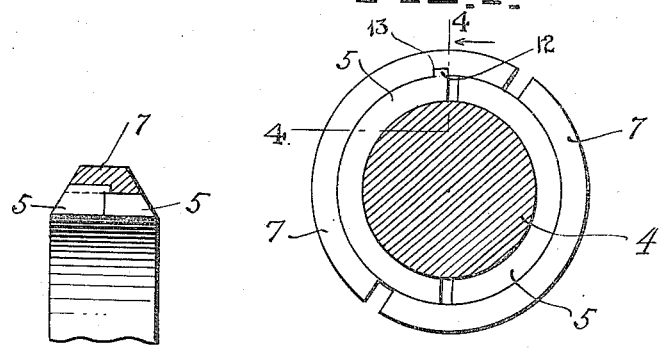
Figure 3:
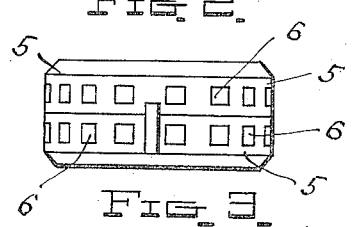

Figure 1 is a longitudinal section of a stuffing box provided with a packing embodying my invention; Fig. 2 is an end view of the packing ring removed from the stuffing box; Fig. 3 is a top plan view of Fig. 2; and Fig. 4 is a section on line 4—4, of Fig. 2.

In the drawings 1 is a stuffing box whose outer end is closed by the usual cover or cap 2 secured by any suitable fastening means or screws 3. The numeral 4 indicates a piston rod or stem passing through said stuffing box. 5, 5, are packing rings which are preferably divided into two sections, as shown in Fig. 2, and provided at intervals with steatite sections 6 which pass entirely through the rings 5, 5 as shown in Figs. 1 and 3, for the purpose of lubricating the piston rod. Surrounding said packing ring sections is a holding ring 7 which is likewise divided into two sections as indicated in Fig. 2 said sections coming in contact with the lubricating sticks of steatite 6. Said ring sections 7 and rings 5, 5, may be provided with notches and extensions to prevent rotation or slipping upon each other as shown in Fig. 4. 8, 8, are rings adapted to surround the divided rings 5, 5, and 7, the inner faces of the rings 8, 8, being made parallel with the periphery of the rings 5, 5, and 7, inclosed by them. The faces of the rings 5, 5, and 7 are made conical to be engaged respectively by conical surfaces on the rings 8, 8.

A coil spring 9 is made to surround the piston rod and bear at one end against the inner ring 8, while the inner end of the spring is seated against the flange 10 of the surrounding shell 11, said shell acting as a pocket or receptacle for the spring 9.

From the foregoing disclosure it will be seen that as the packing rings 5 wear they will be uniformly and directly forced against the piston rod by the spring 9 pushing against the inner ring 8'. Furthermore should there be any vibration of the piston rod 4 said packing rings 5, 5, together with the rings 7 and 8 can readily take up the movement of the piston rod without disturbing their close fit against the piston rod. By constructing the shell 11 in the relation with the coil spring 9 as shown, said spring can move with the shell 11 without disturbing its relation with the other members of the stuffing box. Also, by providing the steatite lubricating sections in the packing rings, the necessity of having oiling swabs or lubricating cups, is entirely obviated. It will also be seen that the packing ring sections 5, 5, will be capable of having any lateral movement due to the vibration of the piston rod 4, as the inner ring 8' will yield and readily be returned by the action of the spring 9. Also, by the constant vibration of the piston rod 4, the metallic packing ring sections 5, 7, 8 and 8', and the lubricating sticks 6, placed entirely through the rings 5, are in constant motion, and by such movement of the inner rings 5 and the outer rings 7, the lubricant of the sticks 6 is spread all through the packing, as well as lubricating the piston rod 4. In order to preserve the proper relation between the inner packing ring sections 5, and the outer section 7, there is provided a lug or lugs 12 on the outer side of the rings 5, which engage a properly placed recess or recesses 13, in the inner side of section 7, thereby interlocking said sections and preventing the steam from blowing through the packing and removing the lubricant from the several parts.

What I claim is:—

1. A metallic packing comprising a stuffing box adapted to slidingly receive a piston rod, metallic sectional packing rings surrounding said piston rod, lubricating material embedded in and extending through said packing rings, a split ring surrounding said sectional rings, the sides of the split ring and sectional rings being conical, a ring on each side of said split ring and packing rings conforming to the conical surfaces of said inner rings and terminating at the split ring, a shell within said stuffing box and having a flange at its inner end loosely surrounding the piston rod, a coil spring surrounding the piston rod one end of which abuts against the flange of the shell and its other end engages the inner surrounding ring.

2. A metallic packing comprising a stuffing box adapted to slidingly receive a piston rod, metallic sectional packing rings surrounding said piston rod, a split ring surrounding said sectional rings, the sides of the split ring and sectional rings being conical, means for locking said rings against movement on each other, a ring on each side of said split ring and packing rings conforming to the conical surfaces of said inner rings and terminating at the split ring, a shell within said stuffing box and having a flange at its inner end loosely surrounding the piston rod, a coil spring surrounding the piston rod one end of which abuts against the flange of the shell and its other end engages the inner surrounding ring.

In testimony whereof I affix my signature in presence of two witnesses.

WILLIAM SUDEKUM.

Witnesses:
 RICHARD CHESLEY WILLIAMS,
 FINIS MATHEW DEAN.